United States Patent [19]

Stanek

[11] Patent Number: 4,475,615
[45] Date of Patent: Oct. 9, 1984

[54] POWER STEERING SYSTEM

[75] Inventor: Gary C. Stanek, Taylor, Mich.

[73] Assignee: Massey-Ferguson Inc., Detroit, Mich.

[21] Appl. No.: 408,394

[22] Filed: Aug. 16, 1982

[51] Int. Cl.³ .............................................. B62D 5/10
[52] U.S. Cl. ..................................... 180/160; 180/132
[58] Field of Search ................ 180/160, 154, 140, 132

[56] References Cited

U.S. PATENT DOCUMENTS 2,507,106  5/1950  Knapp ................................. 180/160
3,527,316  9/1970  Jones, Jr. et al. .................... 180/160

FOREIGN PATENT DOCUMENTS 231417  4/1960  Australia ............................ 180/160

Primary Examiner—David M. Mitchell
Assistant Examiner—Donn McGiehan
Attorney, Agent, or Firm—John C. Thompson

[57] ABSTRACT

A power steering system for a vehicle of the type having an axle (12) which supports a pair of steerable wheels (24) at opposite ends of the axle, the steerable wheels being interconnected by a steering linkage which includes steering arms and a tie rod interconnecting the steering arms. The steering system includes a double rodded steering cylinder assembly (30) having a pair of rods (52, 54) extending outwardly of a cylinder (48), one end of one rod (52) being secured to the tie rod by suitable structure (56, 58). The cylinder is in turn secured to the axle by mounting means (60) including a spherical bushing assembly to provide for universal movement of the cylinder assembly. The mounting means includes a mounting member (62) secured to the axle, a cylinder extension (66) which passes through the mounting member, and a spherical bearing which interconnects the cylinder extension (66) with the mounting member (62).

2 Claims, 2 Drawing Figures

POWER STEERING SYSTEM

FIELD OF THE INVENTION

The present invention relates generally to power steering systems for vehicles of the type having a pair of steerable wheels carried by an axle and interconnected by a steering linkage which is of the type having a tie rod connecting steering arms. The tie rod is adapted to be moved by means of a hydraulic motor which extends between the axle and the tie rod. The motor is in turn interconnected with a source of fluid under pressure. More particularly, the present invention relates to a power steering system of the type referred to above wherein the hydraulic motor is a double rodded extensible and retractable double acting hydraulic cylinder assembly, and the source of fluid under pressure is a hydrostatic steering unit, the steering unit being interconnected with the double acting hydraulic cylinder assembly only by means of a pair of fluid lines.

BACKGROUND ART

Prior art devices of the type having a hydraulic cylinder assembly extending between an axle and a tie rod are well-known in the art. Typical examples are U.S. Pat. No. 2,163,892 and 3,527,316. These patents disclose a double acting hydraulic cylinder assembly having a cylinder secured to the axle and a single piston rod which is secured at one end to the tie rod. As is well-known in the art, this type of cylinder assembly requires a smaller volume of fluid to retract the piston rod one unit of length than to extend the piston rod one unit of length, as the piston rod, which extends only to one side of the piston, occupies part of the internal volume of the cylinder. The prior art, as for example Australian No. 231,417, also recognizes that it is desirable for the cylinder to be secured to the axle for universal movement since the end of the piston rod secured to the tie rod moves in a non-linear path.

Hydrostatic steering units are also well-known in the prior art. One commonly used form of hydrostatic steering unit displaces equal volumes of fluid to the outlet ports when the steering wheel is turned equal amounts to either the right or to the left. Obviously, if the outlet ports of such a commonly used hydrostatic steering unit were interconnected to a conventional cylinder of the type illustrated in the aforementioned patents, the steering response of the vehicle would be uneven. Thus, a turn to the right could be sharper than a turn to the left for corresponding movements of the steering wheel to the right or to the left.

In order to overcome the problems referred to above when utilizing a hydrostatic steering unit with a single rodded steering cylinder, specialized hydrostatic steering units have been proposed, such as that shown in U.S. Pat. No. 3,528,521. Alternatively, special hydraulic circuits may be provided as shown in U.S. Pat. No. 3,497,032.

It has also been recognized that double rodded cylinders may be advantageously used in a power steering system. Various steering configurations have been proposed to utilize the advantages of the double rodded cylinder, and representative examples are shown in U.S. Pat. No. 2,507,106, 2,930,631, 3,480,100, 3,768,585 and 3,782,491. However, applicant is not aware of any prior art which teaches that a double rodded cylinder assembly can be used when the cylinder assembly extends between an axle and a tie rod.

SUMMARY OF THE INVENTION

In accordance with the principles of this invention, a double rodded hydraulic cylinder assembly is provided which extends between an axle and a tie rod, one end of one of the piston rods being interconnected with the tie rod, and the cylinder being connected to the axle by mounting means which is capable of securing the cylinder to the axle for universal movement.

More specifically, this invention relates to a steering system for vehicles wherein a double rodded double acting hydraulic steering cylinder assembly extends between an axle and a tie rod, one end of one of the piston rods being interconnected with the axle by mounting means which permits universal movement of the cylinder relative to the axle. The mounting means includes a mounting member which is secured to the axle, the mounting member including a spherical recess. In addition, the mounting means includes a cylindrical extension which is secured to one end of the steering cylinder, the cylindrical extension including a spherical member received within the spherical recess whereby universal movement of the cylinder is permitted.

The foregoing will be more apparent to those skilled in the art after a consideration of the following detailed description taken in conjunction with the accompanying drawings.

DETAILED DESCRIPTION OF A PREFERRED EMBODIMENT

Figure 1:
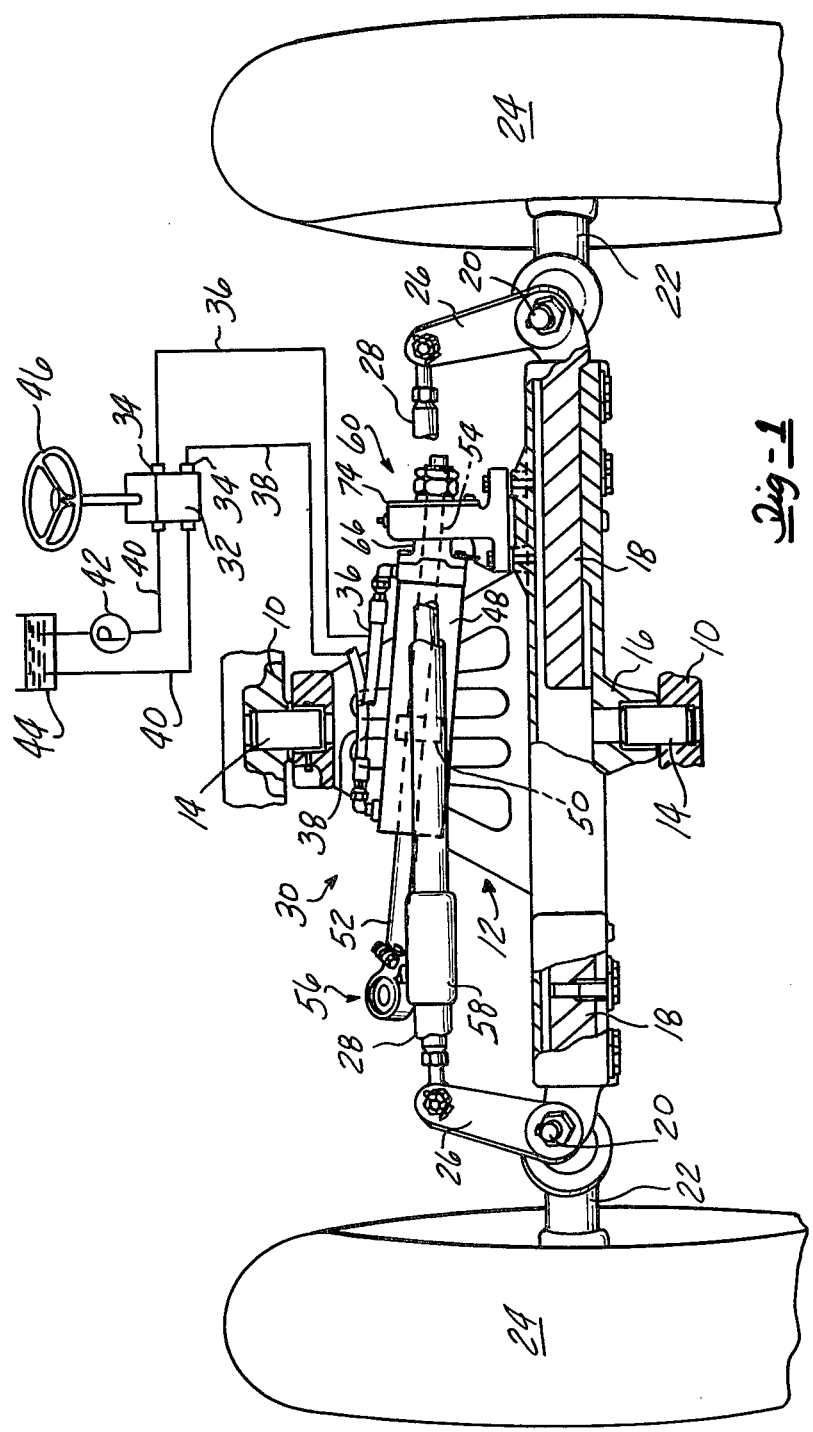
FIG. 1 is a plan view of the front axle of the vehicle and steerable wheels associated therewith, and further indicates schematically the hydraulic circuit which is used to control the movement of an extensible and retractable double rodded hydraulic steering cylinder assembly.
Figure 2:
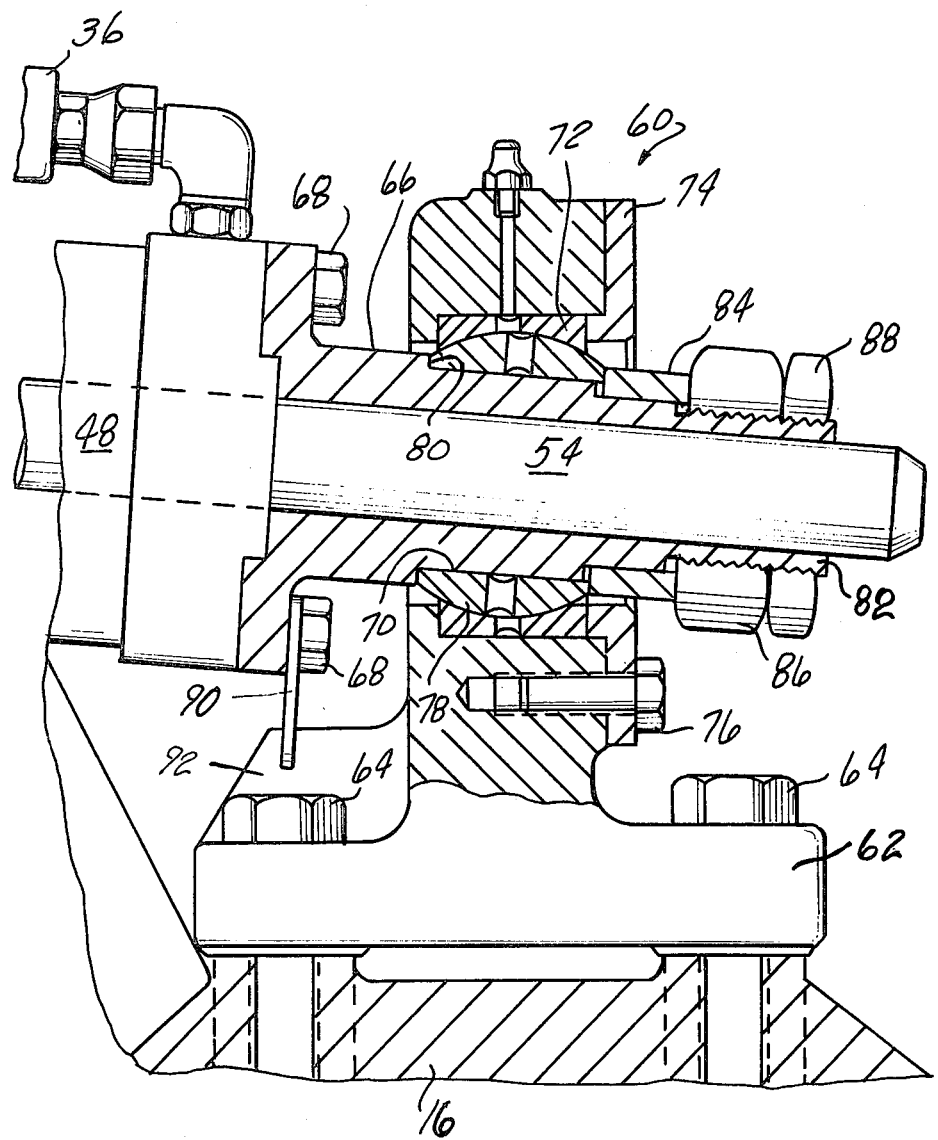
FIG. 2 is an enlargement of a portion of FIG. 1 showing further details of the mounting means which is utilized to mount one end of the steering cylinder assembly to an axle.

A vehicle, such as a farm tractor or the like, is provided with a frame having spaced-apart fore and aft portions 10 to which an axle, indicated generally at 12, is secured by spaced-apart trunions 14. The axle is an assembly having a center section 16 and telescoping extensions 18 which permit the width of the axle to be varied. Each of the extensions 18 carries at its outer end a king pin 20 to which a stub axle 22 is secured at one end, a steerable wheel 24 in turn being journaled upon the stub axle 22. Steering linkage in turn interconnects the steerable wheels 24, the steering linkage including steering arms 26 mounted on the other ends of the king pins 20, and a tie rod 28, which extends in between the ends of the steering arms 26 remote from the king pins 20. It should be noted that the length of the tie rod can be varied to accommodate for differences in the overall length of the axle 12.

In accordance with this invention, a double rodded double acting hydraulic steering cylinder assembly, indicated generally at 30, is provided for steering the steerable wheels 24, the assembly extending between the axle 12 and the tie rod 28 and being operatively interconnected thereto in a manner which will be described below. The vehicle is further provided with a hydrostatic steering unit 32, the outlet ports 34 of which are interconnected with the cylinder assembly 30 by first and second fluid lines 36, 38. As is conventional, additional fluid lines 40 interconnect the inlet and exhaust ports of the hydrostatic steering unit 32 with a source of fluid under pressure, for example, a pump 42, and a reservoir 44. A steering wheel 46 is also provided which is interconnected with the hydrostatic steering unit 32 for controlling its operation. The hydrostatic steering unit 32 is of the type which displaces equal volumes of fluid to the outlet ports when the steering wheel 46 is turned equal amounts to either the right or to the left. Thus, if the steering wheel 46 would turn one revolution to the right, a volume of fluid would be discharged into line 36 which would be equal to that volume of fluid which would be discharged into line 38 if the steering wheel had been turned one revolution to the left.

The cylinder assembly 30 includes a cylinder 48 having a piston 50 reciprocably mounted therein. A pair of piston rods 52, 54 extend to opposite sides of the piston 50 and outwardly of the cylinder 48. One end of one rod 52 is interconnected with the tie rod 28. The other rod 54 is not secured to anything and the only purpose of rod 54 is to insure that the cross sectional fluid area is the same to either side of the piston 50. The rod 52 may be secured to the tie rod 28 in varying manners. In the preferred manner, illustrated in FIG. 1, a ball joint assembly 56 is utilized, one portion of the assembly 56 being secured to the end of the rod 52, and the other end of the assembly 56 being secured to a bracket 58 carried by the tie rod 28.

It should be noted that when the double rodded double acting cylinder assembly 30 is caused to be extended or retracted that the end of the tie rod 28 will not move in a linear path. This is due to the opposed inclination of the king pins 20, the angle of the steering arms 26 with respect to the centerline of the axle 12, and also due to the circular movement of the ends of the steering arms 26. Because of the complex movements involved, it is essential that the end of the cylinder assembly 30 be secured to the axle 12 for universal movement. Accordingly, in accordance with this invention, a novel mounting means, indicated generally at 60, is provided, the mounting means accommodating generally universal movement by means of a spherical mount. The mounting means 60 include a mounting member or cylinder support 62 which is secured to the axle by bolts 64. In addition, a bearing mount in the form of a cylinder extension 66 is secured to one end of the cylinder 48 by means of bolts 68, a cylindrical portion 70 of the cylinder extension 66 passing through a suitable aperture of the mounting member 62. To this end it should be noted that a bushing assembly is mounted on the cylindrical portion 70, the bushing assembly included a spherical recess forming means 72 disposed within the mounting member 62 and held in place by a retainer 74 which is also held in place by bolts 76. As can be seen, the retainer 74 holds the outer race or spherical recess forming means 72 from axial movement. The bushing assembly also includes a spherical member or inner race 78 provided with a suitable cylindrical aperture which permits the spherical member 78 to be mounted on the cylindrical portion 70, one end of the spherical member 78 abutting a shoulder 80 formed adjacent the cylindrical portion 70. The cylinder extension 66 is also provided with a threaded end 82 remote from the end which is secured to the cylinder 48. Holding means are mounted on the cylinder extension 66, the holding means including a cylindrical blocking ring 84, one end of which is forced into engagement with the spherical member 78 to force the other side of this spherical member into engagement with the shoulder 80 to restrain the inner race from axial movement with respect to the extension 66. To this end, the holding means further includes a first nut 86 which is threaded onto the threaded end 82 and engages the cylindrical blocking ring 84 to force it into engagement with the spherical member 78. Finally, a jam nut 88 is provided, the jam nut engaging the first nut 86 and holding it in its desired position. A bifurcated plate 90 engages opposed sides of rib 92 on support 62 to hold the cylinder 48 from rotation about the piston and rods, the plate 90 being held securely in place against the extension 66 by bolt 68.

It should be apparent from the above that as the steering wheel 46 is rotated equal distances to the right or left that the piston 50 and rods 52 and 54 will be moved equal distances. As the piston rod 52 moves with respect to the cylinder 48, it can be seen that the mounting means 60 provides for the universal movement required during such movement.

While the preferred design in which the principles of the present invention have been incorporated are shown and described above, it is to be understood that the invention is not to be limited to the particular details shown and described above, but that, in fact, widely differing means may be employed in the practice of the broader aspects of this invention.

What is claimed is:

1. A power steering system for a vehicle of the type having a pair of steerable wheels mounted on opposite ends of an axle, steering linkage including tie rod interconnecting the steerable wheels, a double-acting hydraulic steering cylinder assembly, a hydrostatic steering unit, first and second fluid lines interconnecting opposite sides of the steering cylinder assembly with the hydrostatic steering unit, and a steering wheel interconnected with the hydrostatic steering unit, said hydrostatic steering unit displacing a first quantity of fluid to said fluid line when the steering unit is turned one revolution in a first direction, and said hydrostatic steering unit displacing an equal quantity of fluid to the second fluid line when the steering wheel is turned one revolution in a second direction; characterized by said double-acting steering cylinder assembly having a cylinder, a pair of rods extending in opposite directions outwardly of the cylinder, one of said rods being connected to tie rod, and mounting means capable of securing the cylinder to the axle for universal movement, the mounting means including a mounting member secured to said axle, a cylinder extension secured to said cylinder, and a spherical member, said mounting member being provided with spherical recess forming means, and the cylinder extension carrying the spherical member for universal movement within the spherical recess, said cylinder extension including a cylindrical portion, a shoulder adjacent said cylindrical portion, and threaded end portion, said spherical member being provided with a cylindrical aperture of substantially the same size as said cylindrical portion and being mounted thereon, and the mounting means being further characterized by the provision of holding means capable of holding the spherical member against said shoulder.

2. The power steering system as set forth in claim 1 wherein the holding means includes a cylindrical blocking ring, a first nut disposed about the threaded extension and capable of forcing the cylindrical blocking ring into firm engagement with the spherical member, and a jam nut also mounted on the threaded extension and capable of jamming the first nut from rotation.

* * * * *